United States Patent Office 3,209,895
Patented Oct. 5, 1965

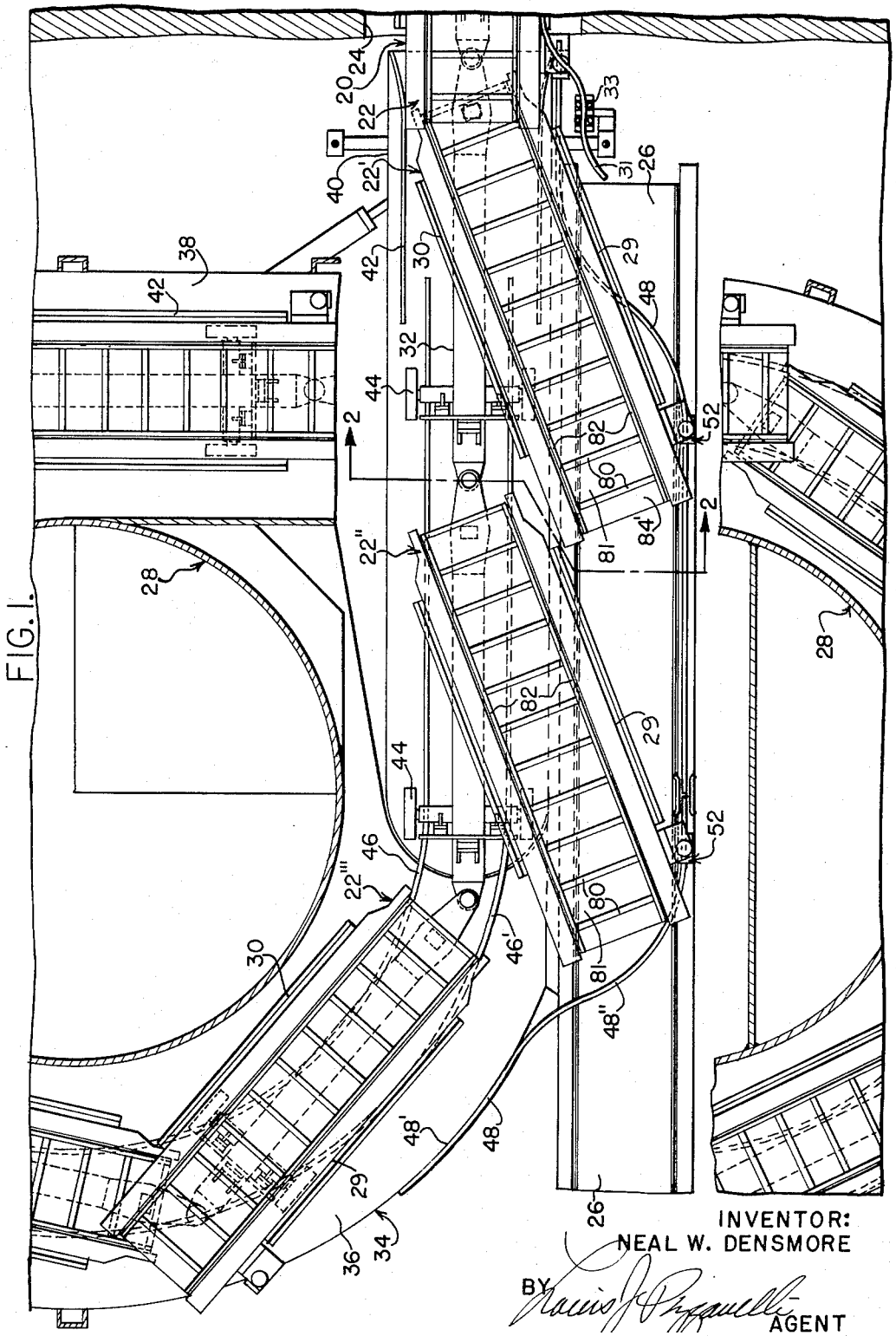

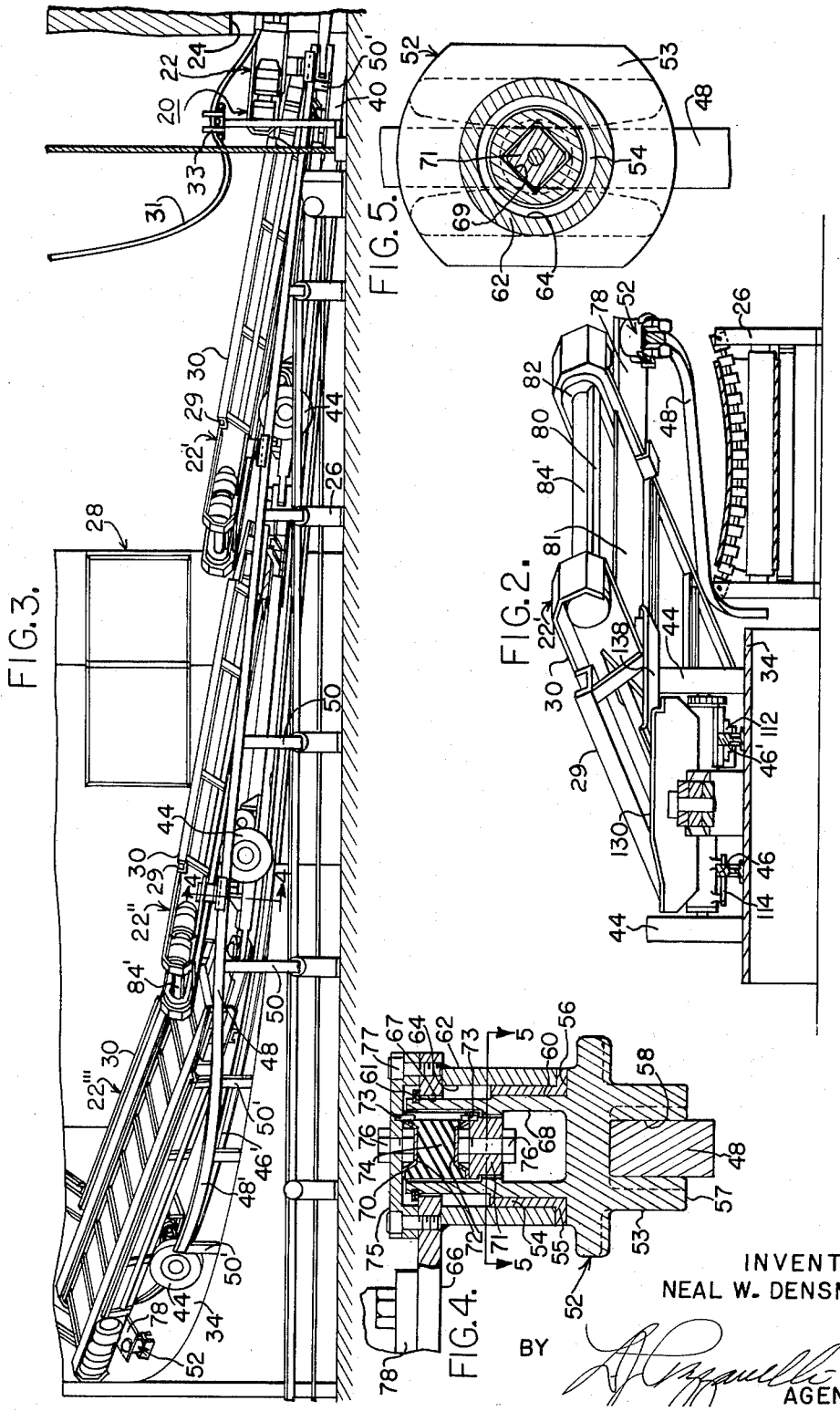

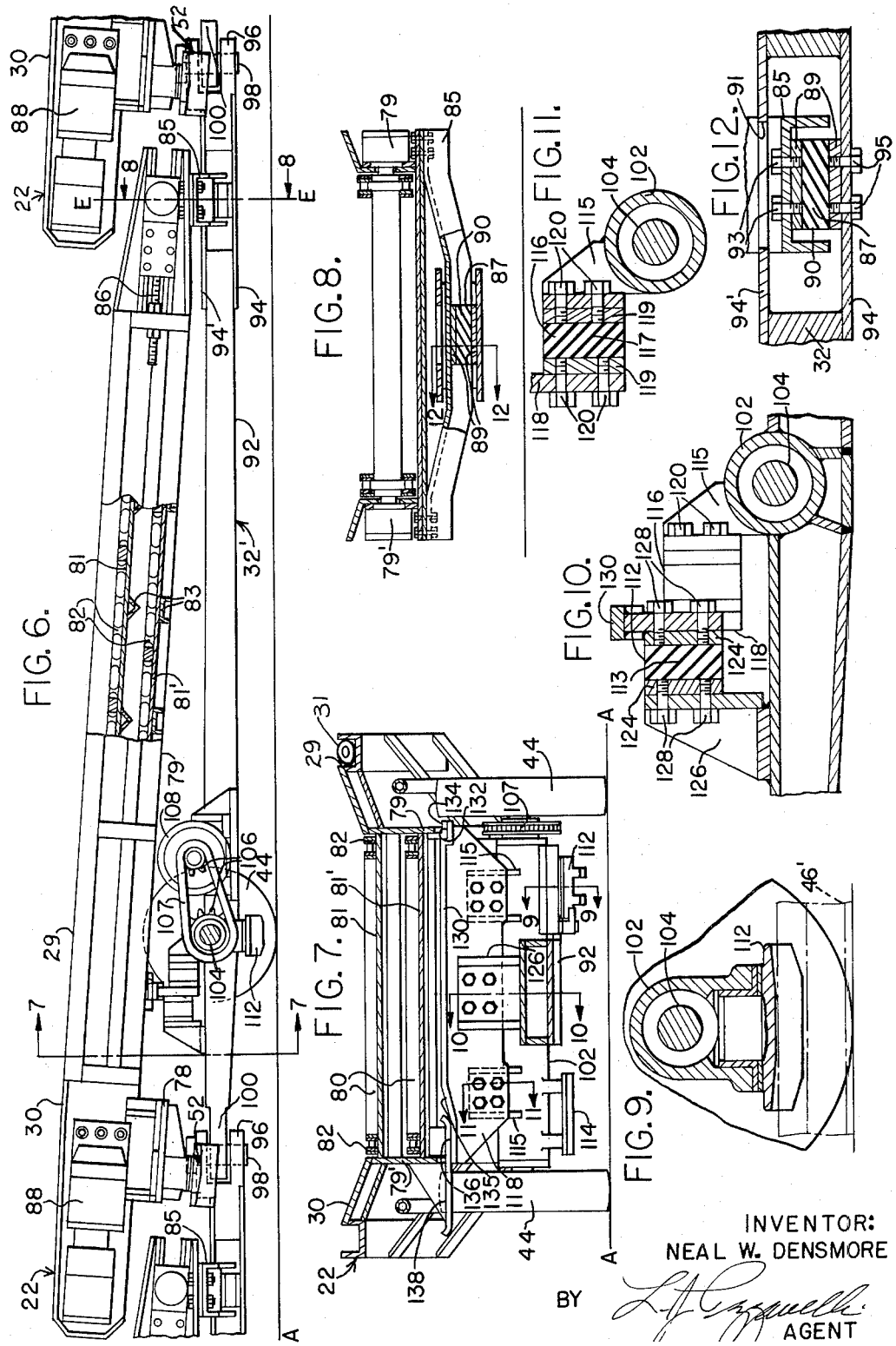

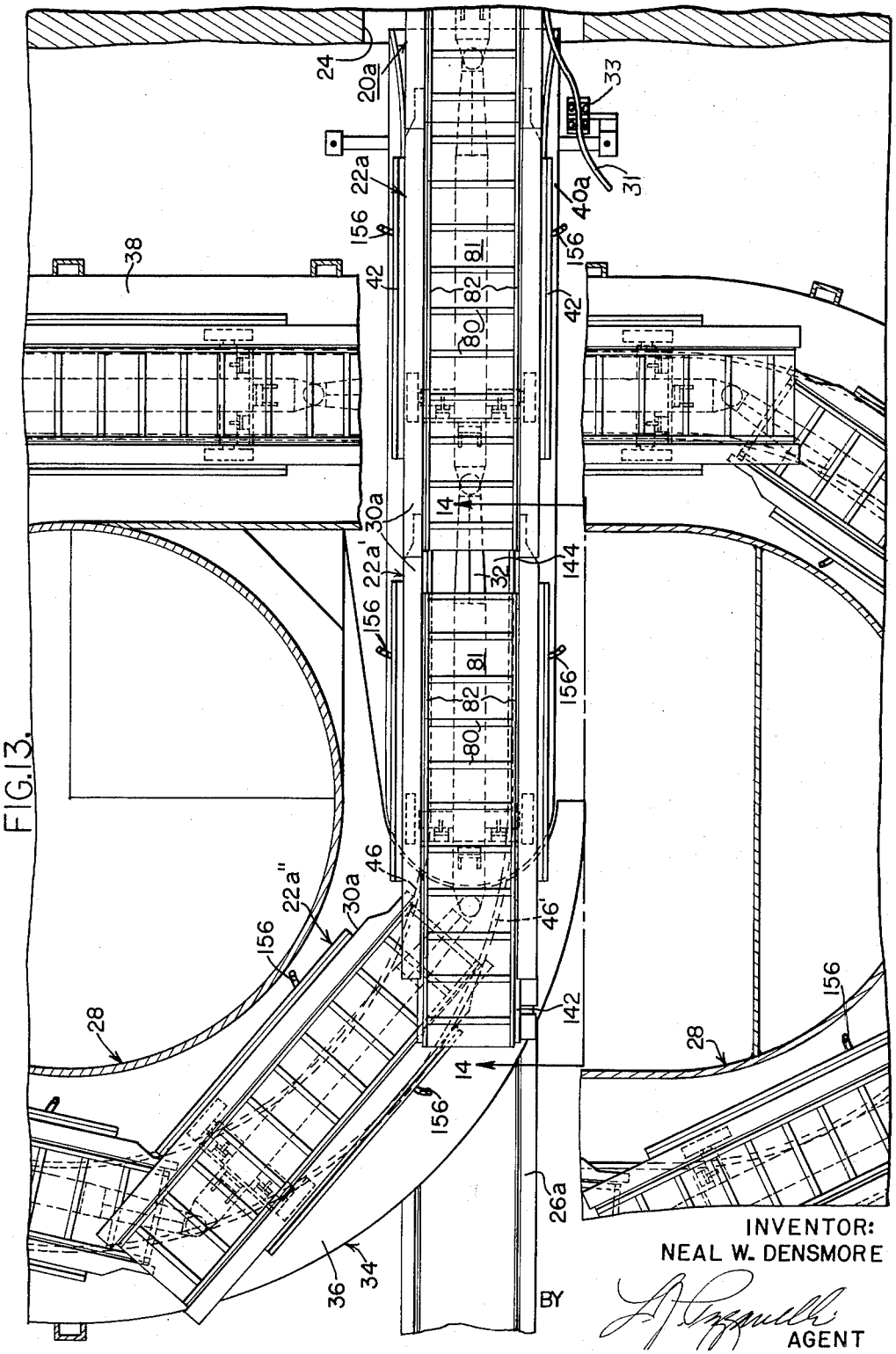

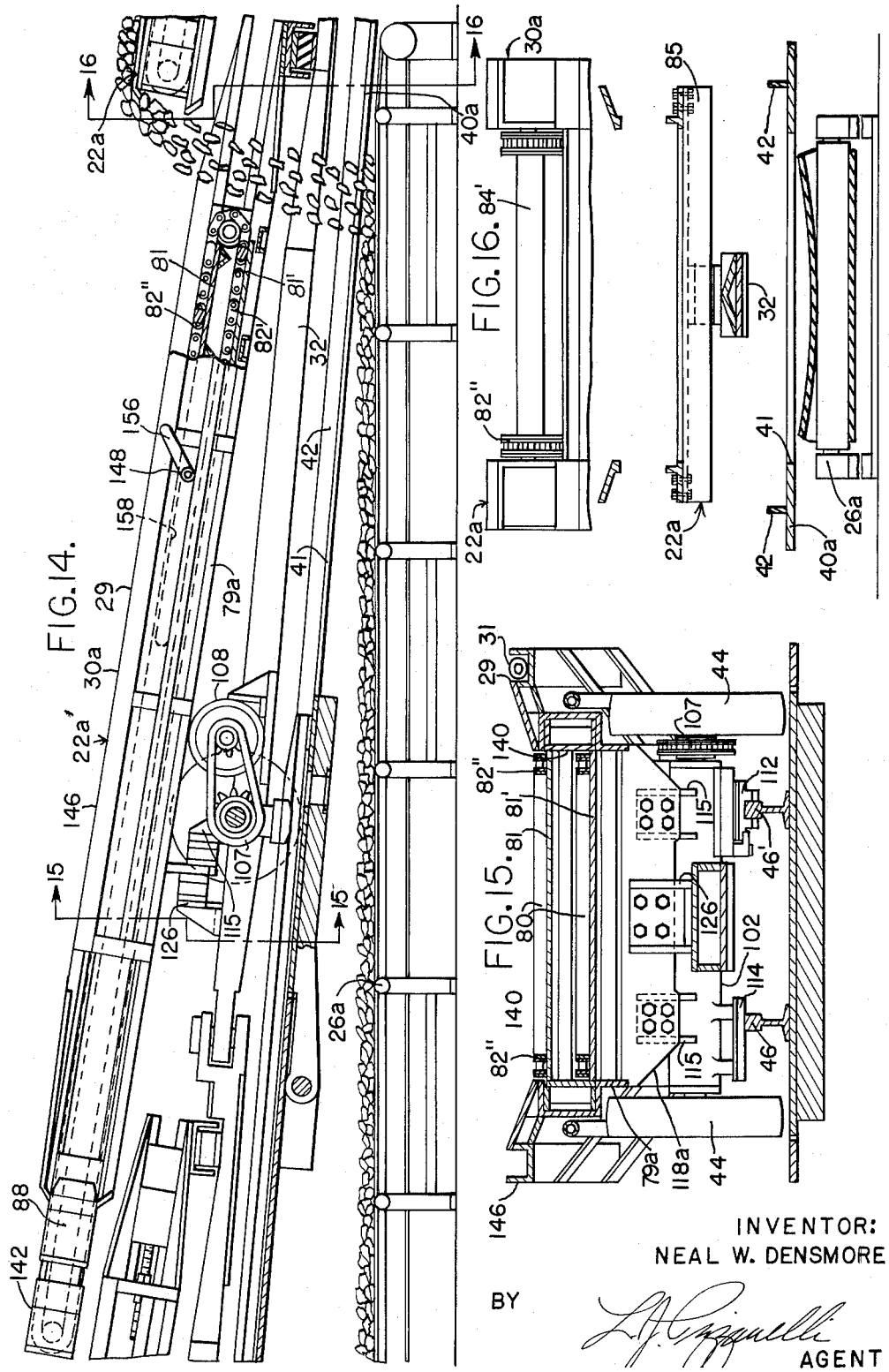

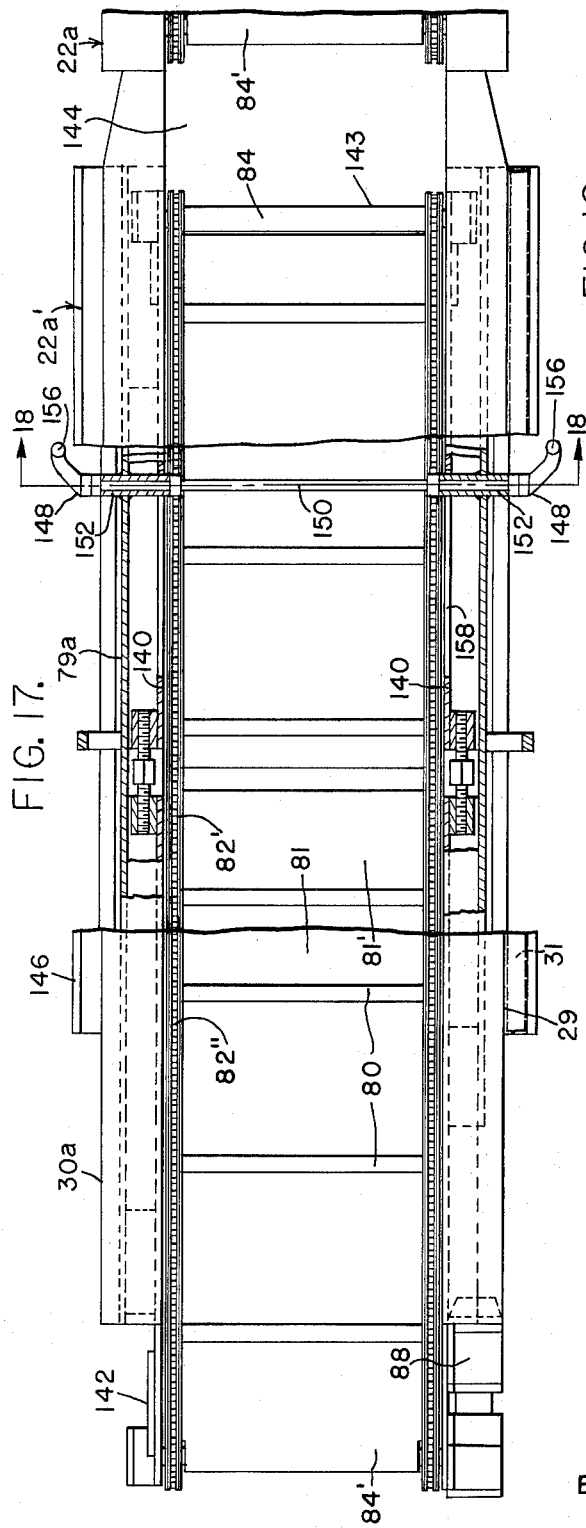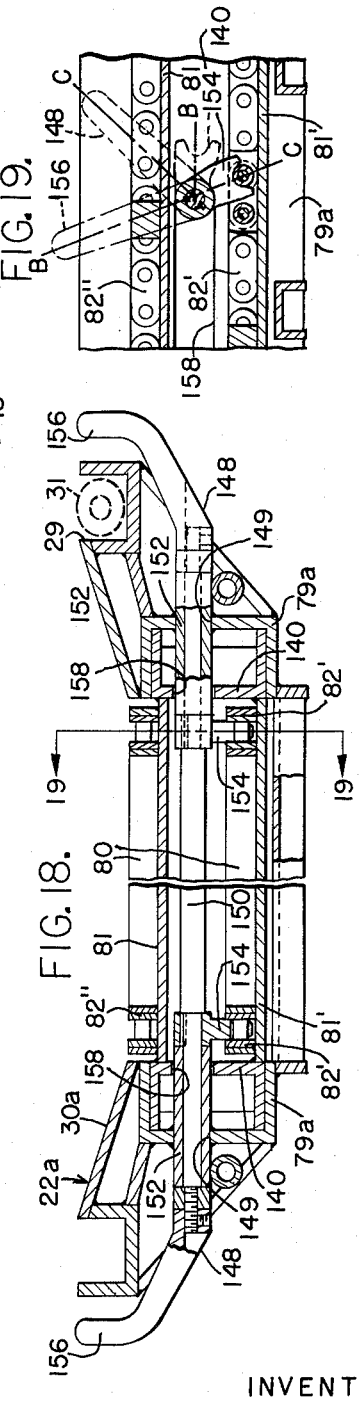

3,209,895
PIVOTALLY CONNECTED CONVEYOR
APPARATUS
Neal W. Densmore, Franklin, Pa., assignor to Joy Manufacturing Company, Pittsburgh, Pa., a corporation of Pennsylvania
Filed May 25, 1961, Ser. No. 112,680
6 Claims. (Cl. 198—92)

This invention relates to a conveyor and more particularly to an elongated flexible string of conveyors connected to follow a miner and to be movably supported upon and transportable by a self-propelled structure.

An elongated flexible string of conveyors arranged to follow a miner and to transport in cascade manner, a mineral product of the action of such miner, is well known in the art. Various methods have been tried in the past for unloading such a connected string of conveyors. One such method was to continually utilize the whole string of conveyors, the unloading being accomplished by the conveyor unit most remote from the mining machine, thus requiring a gathering conveyor of a length equal to the expected travel of the mining machine or use of a surge car or other mobile receiving means. In the case of a mining machine adapted to mine continuously more than a hundred feet this method becomes prohibitively expensive. Another method of unloading such a string of conveyors was to reverse the conveying direction of one of the individual conveyors at a preselected position, thus causing the mineral product to be carried toward the mining machine and carried under a superposed rearward portion of the next conveyor unit less remote from the mining machine. The mineral product being carried toward the mining machine would then fall beneath the string of conveyors to an underlying gathering conveyor. The use of this method precluded the possibility of properly unloading any large fragments of mineral or rock which might be extracted from the mining area, or be the product of a roof fall anywhere along the line of conveyors.

It is accordingly an object of this invention to provide a new and improved articulated cascade type of conveyor.

It is another object of this invention to provide a method and apparatus of unloading an articulated cascade type of conveyor at any preselected point along the length of such conveyor.

It is a more specific object of this invention to provide a new and improved articulated cascade type of conveyor adapted to follow a mining machine, having a series of conveying units which can be unloaded at any one of the points of articulation.

It is a further specific object of this invention to provide a new and improved articulated cascade type of conveyor movably supportable upon, and transportable by a self-propelled structure which can be unloaded at whichever point of articulation is properly positioned upon such supporting structure.

Another specific object of this invention is to provide a new and improved self-propelled conveyor unit having conveying means pivotably supported on ground engaging means; the conveying means being secured in normal operating relation to the ground engaging means by formed elements cooperating under gravitational force.

It is a further specific object of this invention to provide a new and improved self-propelled conveyor unit having resilient means interposed between a ground engaging means and conveying means to resiliently support such conveying means and provide a shock absorbing yieldable support for such conveying means.

According to the present invention there is presented an elongated string of conveyor units, arranged to follow a miner and adapted to be operated in cascade fashion, which is provided with means for unloading the conveyor at the rearward end of any one of the conveyor units. Unloading of the conveyor may thus be kept within a limited area, of a length no greater than the length of two of the conveyor units. This invention also provides for the unloading of large fragments of mineral or rock without interfering with the normal conveying operation.

These and other objects of the invention will become more apparent upon consideration of the following detailed description of preferred embodiments thereof when taken in conjunction with the following details in which:

FIG. 1 is a top plan view of an articulated cascading type of conveyor constructed in accordance with the principles of this invention and a horizontal section of a portion of a self-propelled supporting structure cooperable therewith, FIG. 2 is a sectional view taken substantially on line 2—2 of FIG. 1, FIG. 3 is a side elevational view of the embodiment of FIG. 1, FIG. 4 is an enlarged sectional view taken substantially on line 4—4 of FIG. 3, FIG. 5 is a sectional view taken substantially on line 5—5 of FIG. 4, FIG. 6 is an enlarged fragmentary view of a portion of FIG. 3, FIG. 7 is a sectional view taken substantially on line 7—7 of FIG. 6, FIG. 8 is a sectional view taken substantially on line 8—8 of FIG. 6, FIG. 9 is an enlarged fragmentary sectional view taken on line 9—9 of FIG. 7, FIG. 10 is an enlarged fragmentary sectional view taken substantially on line 10—10 of FIG. 7, FIG. 11 is an enlarged fragmentary sectional view taken substantially on line 11—11 of FIG. 7, FIG. 12 is an enlarged fragmentary sectional view taken substantially on line 12—12 of FIG. 8, FIG. 13 is a top plan view of a portion of another embodiment of a cascade type articulated conveyor constructed according to the principles of this invention, and includes a horizontal sectional view of a portion of a supporting structure cooperable therewith, FIG. 14 is a side elevational sectional view of the conveyor shown in FIG. 13 taken substantially on line 14—14 of FIG. 13, FIG. 15 is a sectional view taken substantially on line 15—15 of FIG. 14, FIG. 16 is a sectional view taken substantially on line 16—16 of FIG. 14, FIG. 17 is a top plan view partly in section of the apparatus of FIG. 14, FIG. 18 is an enlarged sectional view taken substantially on line 18—18 of FIG. 17, FIG. 19 is a fragmentary sectional view taken substantially on line 19—19 of FIG. 18.

Referring to FIGS. 1 and 3 there is illustrated an articulated cascade conveyor 20 suitably universally pivotally connected to a miner (not shown) and adapted to follow such miner in its attack upon a mineral vein through an opening 24 formed in such mineral vein by the action of the miner. The conveyor 20 comprises a plurality of elongated self-propelled flight conveyor units 22 suitably universally pivotably connected in series so that a mineral product suitably fragmented by the miner and removed from the mineral vein will be delivered by the miner to the first of the units 22 adjacent the rearward end of such miner. The mineral product is then moved in a substantially continuous operation, by a series of the units 22 from one unit to the next rearward such unit in a cascade manner well known in the art. When the mineral product is transported out through the opening 24 it falls upon, and is rearwardly transported by, a conveyor unit in the position indicated as 22', having an upper frame portion 30 obliquely positioned in relation to a lower frame 32 and to the line of the above mentioned conveyor units 22 within the opening 24 in the mineral vein. The oblique positioning 22' of a conveyor unit, accomplished in a manner hereinafter to be explained, causes the mineral product to be delivered to an underlying, permanently positioned, elongated belt type, troughing conveyor 26 of a type well known in the art which suitably delivers the mineral product to a storage or haulage system of the area being mined. It is to be noted that three of the conveyor units 22 are designated as 22' 22'' and 22''' respectively; these conveyors are identical with all other units 22 and are differently numbered only with reference to their positions relative to the opening 24. For example unit 22'' will hereinafter be understood to refer to any unit 22 in the position illustrated as 22''.

A portion of self-propelled conveyor storage unit 28 is shown which has ground engaging means to render it movable over a surface and has in horizontal cross section a generally ovate form with straight parallel sides and semi-circular ends. Situated intermediate the ends thereof is a flat elongated ramp 40 which is vertically and horizontally adjustable to launch the conveyor 20 into the opening 24 in the mineral vein, in the proper horizontal and vertical relationship thereto, and is also utilizable when retrieving the conveyor 20 from the opening 24. The ramp 40 is suitably universally pivotably attached to a helical conveyor storage deck 34 having curved portions 36 and straight portions 38. For further description of the above mentioned self-propelled conveyor storage unit reference is made to the copending application, Serial No. 24,548, filed April 25, 1960, now abandoned which application is assigned to the same assignee as the assignee of this application.

The ramp 40 and each straight section 38 of the storage deck 34 is provided with a pair of laterally spaced elongated trough shaped members 42 rigidly engaged therewith and suitably spaced to rollingly engage and guide a pair of suitable ground engaging means 44 suitably mounted in laterally spaced relationship to each other to support an end portion of the lower frame 32 most remote from the mining operation, hereinafter to be called the rearward end. On each curved portion 36 of the conveyor storage deck 34 a pair of elongated, generally I-shaped, curved guide rails 46 and 46', the inner and outer rails respectively, are secured to the upper surface of each curved portion 36 to support and guide the conveyor units 22 around the curves of the storage deck 34, in cooperation with a guide shoe 112 and a support shoe 114 (see FIG. 7) hereinafter to be described. Extending laterally across the storage unit 28 laterally adjacent the ramp 40 and a portion of the storage deck 34 is the conveyor 26, permanently secured to the structure of the storage unit 28 in a suitable location to suitably receive the mineral product being conveyed thereunto by the conveyor unit in the position indicated as 22'. An elongated, suitably curved, rectangularly cross sectioned unloading rail element 48 suitably supported by and rigidly engaged with a plurality of rectangularly cross sectioned, elongated support members 50 and 50', the support members 50' being shorter than the support members 50, is suitably positioned having a first portion 48' most remote from the opening 24 along the outer edge of the curved portion 36 of the storage deck 34 leading to the ramp 40. The first portion 48' of the rail 48 is parallel with, but elevated above, the outer edge of the deck 34 and increases in elevation relative to the edge of the deck 34 from the end of the rail 48 to the beginning of an outwardly curved second portion 48'' throughout which portion 48'' the elevation above the plane of the deck 34 is unchanged. A third portion of the rail 48 is parallel to the outer edge of the deck 34 but laterally displaced relative to the edge and maintained at the same elevation above the plane of the deck 34, as the elevation of the second portion 48''. The third portion of the rail 48 extends beyond the end of the deck 34 and parallels a portion of the ramp 40. A fourth portion of the rail 48 curves inwardly to a point above the edge of the ramp 40 maintaining the same elevation above the plane of the ramp 40 as was true of the third portion. A fifth portion of the rail 48 parallels the edge of ramp 40 being secured thereto by support members 50 and 50' and decreases in relative elevation thereabove to the end of rail 48 adjacent the opening 24. The unloading rail 48 cooperates with an unloading means 52 on the right rear portion of the upper frame 30 of the conveyor unit 22''' to lift and swing the rearward portion of the upper frame 30 of the successive units 22 into the unloading position in a manner to be hereinafter described. An elongated generally rectangularly cross sectioned unloading shoe element 53 (see FIGS. 4 and 5) of the unloading means 52, has a rectangular groove 58 in its lower surface 57 extending longitudinally therethrough, slidably engageable with the unloading rail 48, and has an upper surface 56 opposite the rectangular groove 58 provided with an upward extending cylindrical boss 60 pivotably received by a flanged bushing 54 having a flange 55 at its lower end to slidably engage the upper surface 56 of the shoe element 53. Another part of the unloading means 52 comprises a tubular support element 62, axially aligned with the boss 60, having a bore 64 to receive and rigidly secure the bushing element 54, thus providing pivotal support for the unloading shoe element 53. The upper end of the tubular support element 62 abuttingly engages and is rigidly secured to a flat plate mounting element 66 having a bore 67 therethrough coaxial with but slightly smaller than the bore 64 of the tubular element 62. The mounting element 66 is rigidly secured to, and supported by, a suitable bracket 78 suitably mounted on the right rear portion of the upper frame 30 of the conveyor unit 22. Extending upwardly through and beyond the bore 67, the cylindrical boss 60 of the shoe element 53 is provided near its upper end with a suitable peripheral recess to suitably receive a retaining means 61 such as a snap ring or the like to retain the shoe element 53 in a desired pivotal relationship with the tubular support element 62. The cylindrical boss 60 of the shoe element 53 has a formed axial opening extending therewithin from its upper end to a terminating surface coplanar with the upper surface 56 of the shoe element 53. The formed opening 68 has cylindrical end portions separated by a square opening 69 (FIG. 5) in the intermediate portion of the formed opening 68 to non-pivotably retain a square anchor element 71. A resilient support member 70, which comprises a formed cylindrical resilient support element 74 securely bonded to a pair of formed mounting elements 72 is freely received within the upper cylindrical end portion of the opening 68. The lower mounting element 72 is secured upon the upper surface of the square anchor element 71 by means of a threaded retaining device such as cap screw 76, rotation between these two elements 70 and 72 being prevented by suitable key and keyway devices 73. The upper mounting element 72 is secured in like manner in non-rotational relationship abuttingly engaged with the inner surface of an inverted cup-shaped cap element 75 rigidly secured on the upper surface of the mounting element 66 by a plurality of threadedly engaged cap screws 77. The result of the above described arrangement is that the shoe element 53 of the unloading means 52 is pivotably supported by the bracket 78 but resiliently constrained to maintain the longitudinal surfaces of the rectangular slot 58 in an orientation parallel to the length of the upper frame 30, such direction being suitable to enable the slot 58 to engage the upper portion of the rail 48 as the conveyor unit 22''' progresses toward the ramp 40 along the curved portion 36 of the helical storage deck 34.

Referring now to FIGS. 6 and 7 the line A—A will be taken as the line of a supporting surface such as a ground line and the arrows on the line 7—7 in FIG. 6 will be taken as pointing in a forward direction toward the miner (not shown) so that in FIG. 7 the right hand side of the view will be the right hand side of the conveyor unit 22 as established by the forward direction defined in FIG. 5. The terms forwardly, upwardly, downwardly, right-hand, left-hand and the like as used herein are applied only for convenience of description and should not be taken as limiting the scope of this invention. The upper frame 30 of each conveyor unit 22 comprises a pair of suitable elongated side members 79, 79', right-hand and left-hand respectively, suitably secured to a pair of deck elements 81 and 81', upper and lower respectively, extending therebetween to support a plurality of conveyor flight elements 80. These flight elements 80 are engaged with and rendered movable by a pair of orbital conveyor chains 82 suitably driven in an orbital manner and constrained to move in such orbital path by a suitable driving means 88, such as an electric motor, connected to a suitable source of electric power (not shown) and suitable sprockets and rollers 84 (see FIGS. 2 and 8) and 84', forward and rearward respectively, in a manner well known in the art. The upper frame member 30 is also provided with a plurality of cross bracing elements 83 to secure the side members 79, 79' in a parallel relationship and to support the decks 81 and 81'. Each side member 79 or 79' of the upper frame 30 has a longitudinal channel 29 formed along the outer edge thereof to suitably receive and support a multiconductor cable 31 communicating between the miner and an external source of electric power (not shown) and also communicating between the miner and a control station on the movable structure 28. The purpose of this cable is to provide guidance control and primary power to the miner. The cable 31 is suitably extensibly secured on rotating drums or the like, in an upper portion of the movable structure 28 and being trained downwardly and forwardly is slidably supported by suitable roller guides as 33 secured to the ramp 40. The cable 31 is trained through the opening 24 and into the channels 29 on the successive units 22, by which it is supported, to be connected to the miner at its forward end. The forward roller and sprocket assembly 84 is provided with an adjusting means 86 to maintain proper tension on the orbiting conveyor chains 82. Immediately below the forward roller 84 and extending parallel thereto, is an elongated, formed forward cross member 85 (see FIG. 8) adapted to support the forward end of the conveyor frame and removably secured to the side members 79 and 79' by bolting. The cross member 85 is provided in its central portion with a resilient support member 87 (see FIG. 12) comprising a resilient element 90 and a pair of metallic plate mounting elements 89, adapted to support the cross member 85 upon the forward portion of the lower frame member 32, being removably secured to the cross member 85 by suitable cap screws 93. The resilient support member 87 provides for rotation, not to exceed 30°, of the upper frame 30, about a vertical axis E—E (see FIG. 6), in relation to the lower frame member 32 (see FIG. 1). The lower frame member 32 (see FIG. 6) comprises an elongated frame element 92 having a hollow rectangular cross section and provided with a generally rectangular flat plate lower support element 94 and a similar upper support element 94' rigidly secured on the upper and lower surfaces of the forward portion of the frame element 92, respectively, forwardly extending therefrom and suitably rigidly secured at their forward portions to a fork-type connecting means 96 provided with a cylindrical pin element 98 and suitable vertically axially aligned bores (not shown), to be pivotably connected to and supported by a rearward end 100 of a similar frame element 92 of the next more forward unit 22. The upper support element 94' has a central opening 91 therethrough to allow the insertion of the cap screws 93 in the resilient mounting member 87 which is supported by the lower support element 94, being suitably secured there to by suitable cap screws 95 (see FIG. 12).

Referring again to FIGS. 6 and 7 there is shown an elongated tubular axle housing element 102 rigidly secured on a rearward portion of the frame element 92, and laterally extending normal thereto. Axle housing element 102 is provided with suitable bearings to suitably pivotably receive an elongated cylindrical axle 104 (see FIG. 9) suitably supported at its extremities by, the therewith rigidly engaged, ground engaging means 44, these being in the present instance hard rubber tired wheels. The axle 104 being suitably provided with suitable sprockets 106, a suitable driving chain 107 and a suitable driving means 108 such as an electric motor connected to a suitable source of electric power, is adapted to render the unit 22 to be self-propelled and movable over a surface. Rigidly secured on the lower surface portion of the axle housing element 102 and extending therebelow near the left-hand extremity thereof is a support shoe element 114 having a substantially flat lower surface to cooperate with the inner guide rail 46 (see FIG. 1) to support the weight of the conveyor unit 22 while it is moving around the curves 36 of the storage deck 34 of the conveyor storage unit 28. Suitably pivotably mounted at the right-hand extremity of the lower surface portion of the axle housing 102 is an inverted U-shaped guide shoe element 112 (see FIG. 9) to support and guide the conveyor unit 22 as it negotiates the curved portions 36 of the conveyor deck 34 (see FIG. 1), by cooperating with the outer guide rail 46'. The two shoe elements 112 and 114 cooperating with the guide rails 46' and 46 respectively lift the wheels 44 off the surface of the helical deck 34 to give closely controlled motion to the conveyor unit 22 as it moves around the curved portions 36 of the deck 34. Such lifting also prevents scrubbing action on the ground engaging means 44 due to difference in the arc of travel of the outer and inner wheels when negotiating the curved portions 36.

Referring to FIGS. 7 and 11 there is shown, mounted on the upper rear quarter of the outer peripheral surface of the axle housing 102, a pair of bracket members 115 equally laterally spaced on either side of the center line of the lower frame 32 to support a pair of resilient support members 116 each of which comprises a resilient element 117 encompassed between and suitably bonded to a pair of rectangular metallic flat plate support elements 119 supplied with suitably spaced threaded bores to threadedly receive suitable cap screws 120 slidably received through suitable spaced bores in the bracket 115 and in a flat plate vertically positioned support element or spacer member 118 (see FIG. 10) hereinafter more fully described. Mounted on the upper surface of the lower frame element 92, approximately midway between the axle housing 102 and the extreme rearward end 100 of the frame element 92 is another bracket element 126 to suitably engage and support another resilient support member 112 comprising a resilient support element 113 and two flat plate metallic support elements 124 abuttingly engaged with and suitably bonded to the resilient support element 113. The metallic support elements 124 are provided with suitable spaced threaded bores to suitably threadedly receive the cap screws 128 which are slidably received in suitable spaced bores in the bracket element 126 and in the support plate element 118. The three resilient mountings 116, 116 and 122 cooperatively, resiliently support the rearward end of the upper frame 30 on each unit 22. The elongated support plate element 118 (see FIGS. 7 and 10) has secured thereto a rectangularly cross sectioned elongated support bar element 130 having its right-hand end suitably formed as a concave right angle 132 to suitably abuttingly engage an angle support element 134 rigidly secured to the lower edge of the right-hand side member 79 of the upper frame 30. Near its left-hand end the support bar element 130 has a downward sloping portion 135 and a flat portion 136 having its upper surface on a level with the upper surface of the concave right angle portion 132 at the other end of the bar element 130. The flat portion 136 suitably supports a shoe element 138 rigidly mounted at the lower edge of the left-hand side member 79' of the upper frame 30. The foregoing members are so shaped and so located as to hold the upper frame 30 in its normal aligned position with the lower frame 32 as long as the downward force of gravity due to the weight of the upper frame 30 is allowed to maintain the abutting engagement of the angle element 134 and the shoe element 138 with the support bar element 130. When the rear portion of the upper frame 30 is lifted up by the action of the unloading means 52 cooperating with the unloading rail 48 the rear portion of the upper frame 30 may be readily swung into the position shown as 22' in FIGS. 1 and 2 by rotating it about the line E—E as an axis (see FIG. 6).

One mode of operation of this invention applicable to the embodiment illustrated in FIGS. 1–11 may be described as follows: A mining machine operating in the conventional manner (see herein above cited copending application) having its forward end engaged with a mineral vein and a rearward end suitably connected to the foremost of the conveyor units 22 of the articulated conveyor 20, deposits a mineral product upon such conveyor. The end of each conveyor unit 22 nearest the mining machine will be hereinafter called the forward part of such conveyor unit. The mineral product deposited upon the forward part of each conveyor unit 22 is carried rearwardly by the flight bars 80 moving rearwardly on the upper deck 81 by action of the obital chains 82. The rearward end of each conveyor unit 22 is superposed above the forward end of each succeeding conveyor unit 22 and the mineral product is carried in a well known cascade fashion from one conveyor unit to another rearwardly until it emerges from the opening 24 in the mineral vein (see FIG. 1). Upon emerging from the opening 24, the mineral product is deposited by the conveyor unit 22 upon the obliquely positioned conveyor unit 22' which because of its oblique positioning is properly placed to deposit the mineral product upon the gathering conveyor 26 which though permanently positioned on the conveyor storage unit 28 is movable with the storage unit 28 and therefore must deposit the mineral product upon another gathering conveyor (not shown) which may be more permanently positioned and connected to the general haulage system of the mining area. As the operation continues, the mining machine advancing in a substantially continuous manner causes the conveyor units 22 to advance into the opening 24 of the mineral vein. As the conveyor unit 22', following the preceding conveyor unit 22, advances, the rearward end of the upper frame 30 of the conveyor unit 22' controlled by the unloading means 52 cooperating with the guide rail 48 is biased to the left of its direction of motion and vertically aligned with and lowered upon the lower frame unit 32 as illustrated in FIG. 7. At this time the conveyor unit 22' operating in a conventional manner will be depositing the mineral product upon the next rearward conveyor unit 22" which in turn will deposit the mineral product upon the gathering conveyor 26 in the manner hereinbefore described. Also at this time the unloading means 52 of the conveyor unit 22''' will be engaged with a lower leading portion 48' of the guide rail 48. As the conveyor unit 22''' advances toward the opening 24 in the mineral vein, the unloading means 52 of the conveyor 22''' cooperating with the portion 48' of the unloading rail 48 will first be biased upwardly thereby raising the rearward end of the upper frame 30 of the conveyor unit 22'''. Thereafter the unloading unit 52 following the unloading rail 48 will be biased to the right of the lower frame 32 carrying the rear portion of the upper conveyor frame 30 into the position illustrated by the conveyor unit 22". As the mining operation continues, each conveyor unit 22 successively takes the positions 22''', 22'', 22' and 22 thus providing a continuous unloading operation without interfering with the continuous mining operation desirably taking place.

FIGS. 13 through 19 illustrate another embodiment of the invention hereinabove described wherein the same numbers as those used on the first embodiment are used to identify parts which are identical to those used in that embodiment and the same numbers with the suffix (a) are used to identify parts similar to those used in the first embodiment. Only those parts will be described in which a definite difference in construction and/or function is present. The gathering conveyor 26a differs from the gathering conveyor 26 of the first embodiment only in its positioning which in this case is directly below and aligned with the ramp 40a, extending transversely across the self-propelled conveyor storage unit 28 for the purpose of delivering the mineral product of the mining machine to another gathering conveyor as described in the first embodiment. The ramp 40a differs from the ramp 40 in being provided with an elongated opening 41 (see FIGS. 14 and 16) extending throughout that part of the ramp 40a which would otherwise overlie the gathering conveyor 26a. An articulated cascade type of conveyor 20a differs from the conveyor 20 of the first embodiment in that the individual conveyor units 22a are made up of the hereinbefore described lower frame 32 and a modified upper frame 30a which is in this modification not slidably but rigidly attached to a modified form of the support plate element 118a which is rigidly secured to a pair of side members 79a but is resiliently supported by being resiliently connected to the support bracket members 115 and 126 (as shown in FIG. 10). A portion 142 of the upper frame 30a, comprising the deck members 81 and 81' rigidly secured to a pair of channel shaped slide members 140 (see FIG. 18), the orbital chains 82, the flight members 80, the forward and rear rollers 84, 84', respectively, with their associated sprockets, is adapted to be slidable forwardly and rearwardly within a channel formed in the side members 79a and shaped to allow such motion. The rearward motion, above described, of the portion 142 of the upper frame 30a is for the purpose of producing a large opening 144 (see FIG. 17) between the forward roller 84 of the conveyor unit 22a' and the rearward roller 84' of the conveyor unit 22a, immediately forward of the unit 22a', to allow the mineral product to fall through such opening 144 onto the gathering conveyor 26a in a manner to be more fully described. A nonsliding portion 146 of the conveyor unit 22a comprising the side members 79a and associated parts, resiliently mounted on the lower frame 32 of the conveyor unit 22a is provided with a slide actuating means 148 (see FIGS. 17, 18, 19) which includes an elongated cylindrical shaft 150 mounted transversely of the upper frame 30a pivotally received by a pair of tubular bearing members 152 which are rigidly engaged by welding or the like in axially aligned bores 149 in the side members 79a, located midway between the upper and lower strands, 82" and 82' respectively, of conveyor chain 82. Rigidly engaged at each end of the cylindrical shaft 150 by the use of a key and set screw or other similar means is a formed elongated handle element 156 to provide for manual rotation of the shaft 150. A formed pawl element 154 rigidly engaged with the shaft 150 is secured by means of a suitable bore, keyway and set screw means to the shaft 150 just inwardly of each bearing element 152 and vertically aligned with each chain 82 respectively. The pawl elements 154 are shaped and positioned to interferingly engage lower strands 82' of the conveyor chains 82 when in the position indicated by the line C—C in FIG. 19. Engagement of the pawl element 154 with the conveyor chain 82 makes it possible for the conveyor drive means 88 to slide the movable portion 142 of the conveyor 22a in a forward or backward direction in relation to the non-sliding portion 146 of the conveyor, in a manner to be hereinafter more fully described. Each channel slide member 140 of the sliding portion 142 is provided with an elongated longitudinally extending slot 158 through which the aligned bearing elements 152 extend, and along which the bearing elements move relatively, during forward or backward motion of the movable portion 142.

Another mode of operation of this invention, applicable to the embodiment illustrated in FIGS. 13 through 19 is as follows: The action of the articulated conveyor 20a is in all respects identical with that of the hereinabove described action of the articulated conveyor 20 as the mineral product is conveyed in cascade fashion from one unit to the other until it emerges from the opening 24 in the mineral vein. The action of the conveyor units 22a from this point rearward differs from the action of the conveyor units 22 and will therefore be described. As a conveyor unit 22a, of the articulated conveyor 20a, advances following the action of the continuous miner from a position illustrated by a conveyor unit 22a″ to the position illustrated by a conveyor unit 22a′ as shown in FIG. 13 the following action takes place. It should be noted that the following action will be described as manual but could be rendered automatic, or remotely controllable, by suitable modifications in the instant embodiment. When a conveyor unit 22a, moving in the hereinabove described manner toward the opening 24 in the mineral vein, reaches the position designated as 22a″ the conveyor driving means 88 is put into operation by the activation of a suitable switch connected to a suitable source of electric power resulting in normal orbital motion of the flight bars 80, those supported on the upper deck 81 traveling from the forward portion of the conveyor unit 22a toward the rear of this conveyor unit. Referring now to FIG. 19, at this time the levers 156 and the pawl elements 154 are in the position marked B—B, with an upper strand of the conveyor chain 82″ traveling from right to left and a lower strand 82′ traveling from left to right as viewed in FIG. 19, the lever 156 now being biased forwardly into the position C—C brings the pawl elements 154 into interfering engagement with the lower strands 82′ of the orbital chains 82. This interfering engagement stops the lower strands 82′ and the reaction through the orbital chains 82 and the forward sprockets and roller 84 (see FIG. 17) causes the movable portion 142 of the upper conveyor frame 30a to move in a rearward direction in relation to the non-sliding portion 146. This rearward movement of the movable portion 142 causes the forward portion 143 (FIG. 17) of the movable portion 142 to be withdrawn from its normal position under the rearward portion of the conveyor of the preceding conveyor unit 22a leaving an opening 144 therebetween. The magnitude of this rearward motion is determined by the length of the slots 158 in each slide member 140 of the movable portion 142. When the movement has been completed the lever 156 is returned to the position B—B rotating the pawl element 154 into a position where it is not engaged with the orbital chain 82 and the conveyor drive motor 88 is then turned off by activating a suitable control (not shown). This relationship of the movable portion 142 and the non-movable portion 146, as described, can be established when the conveyor units are being withdrawn from the opening 24 and can be maintained during storage of the conveyor units 22a on the movable structure 28. The above described relationship of the conveyor elements is maintained while the conveyor unit 22a moves through the position indicated as 22a′ and into the position designated as 22a (see FIG. 12) at which time the driving means 88 is activated in a reverse direction causing the flight bars 80 to move across the upper deck 81 toward the forward portion 143 of the conveyor unit 22a. Referring to FIG. 19 this will result in a motion of the upper strand 82″ from left to right and motion of the lower strand 82′ from right to left as viewed in FIG. 19. The pawl elements 154 are again brought into interfering engagement with the lower strands 82′ by moving the lever 156 from the position B—B into the position C—C. This interfering engagement again stops the lower strands 82′ and reaction of the driving motor 88 on the lower strand 82′, through the rearward sprockets and roller 84′, causes the movable portion 142 to be biased forwardly, thus closing the opening 144 (see FIG. 17) and returning the forward portion 143 of the movable portion 142 to its normal position underlying the rearmost portion of the conveyor unit 22a preceding this one. When the movable portion 142 of the conveyor unit 22a has been moved forward to the limit imposed by the length of the slots 158 in the slide members 140, the conveyor drive motor 88 is again reversed and put into normal operation. This normal operation causes the lower strand 82′ of the orbital chain 82 to move from left to right as seen in FIG. 18. The handle 156 being released will be biased into the position B—B by the action of the lower strand 82′ on the pawl element 154 thus allowing the movable portion of the conveyor 22a to remain in its normal forward position and operate in a normal fashion receiving the mineral product from a preceding conveyor unit 22a and conveying it rearwardly to the opening 144 between its rearward end and the forward end 143 of the next rearward conveyor 22a′. The above described operation is repeated with each conveyor unit 22a as it passes through the positions 22a″ and 22a′ thus furnishing a mode of continuous unloading within the limits of the preselected area defined by the underlying gathering conveyor 26a.

Having described two preferred embodiments of the invention it will be realized that modifications thereof may be made without departing from the broad scope of this invention. Accordingly, it is respectfully requested that this invention be interpreted as broadly as possible and be limited only by the prior art.

What is claimed is:

1. A conveying apparatus comprising an elongated longitudinally extending support, mobile means secured to said support, an endless flight conveyor, a guide frame for supporting said conveyor for movement in an orbital path, means including pivot means for pivotally connecting said guide frame to said support for permitting relative lateral pivotal movement therebetween, means secured to said guide frame and engageable with a formed stationary rail for pivoting said guide frame relative to said support as said guide frame is being moved and means on said support for driving said mobile means.

2. A conveying apparatus comprising an elongated longitudinally extending support, an endless flight conveyor, a guide frame for supporting said conveyor for movement in an orbital path, pivot means pivotally connecting said guide frame to said support for permitting relative pivotal movement therebetween, means secured to said guide frame and engageable with a formed stationary rail for pivoting said guide frame relative to said support as said guide frame is being moved, mobile means operatively secured to said support, and means on said support for driving said mobile means.

3. A conveying apparatus comprising an elongated longitudinally extending support, a guide element secured transversely of said support, said guide element extending upwardly of said support and secured adjacent one end thereof, an endless flight conveyor, a conveyor guide frame for supporting said flight conveyor for movement in an orbital path, pivot means pivotally connecting said guide frame to said support for permitting relative lateral pivotal movement therebetween, means secured to said guide frame and engageable with a formed stationary rail for pivoting said guide frame relative to said support as said guide frame is being moved, and means slidably engageable with the upper surface of said guide element and secured to said guide frame for supporting said guide frame during pivotal movement thereof.

4. A conveying apparatus comprising, an elongated support having a longitudinally extending axis, said support having a transversely extending member secured adjacent one end thereof and pivot means adjacent the other end thereof, mobile means rotatably secured in said transversely extending member, an upwardly extending spacer member positioned intermediate said transversely extending member and said one end of said elongated support, said spacer member being substantially transversely coextensive with said transversely extending member and resiliently secured to said elongated support and to said transversely extending member, a guide element secured to the upper edge surface of said spacer member, an elongated guide frame having the inby end thereof pivotally secured to said pivot means for permitting transverse pivotal movement of said guide frame relative to said elongated support, a shoe element secured to said guide frame and slidably cooperable with said guide element, and means having a portion secured adjacent the outby of said guide frame for pivoting said guide frame about said pivot means relative to said support as said guide frame is being moved and slidably moving said shoe element along said guide element for supporting the outby portion of said guide frame during pivotal movement thereof.

5. A conveying apparatus comprising, a plurality of movable pivotally connected mobile support means, conveying means pivotally connected to said support means respectively for lateral pivotal movement relative to said support means respectively, a rail element stationarily positioned adjacent the path of movement of said support means and said conveying means, and means secured to each of said conveying means for slidably engaging said rail, said rail being formed to laterally pivot each of said conveying means out of and into longitudinal alignment with each other as the respective conveying means move relative to said rail.

6. A conveying apparatus comprising, a plurality of movable longitudinally aligned tandem pivotally connected mobile support means, conveying means pivotally connected to said support means respectively for lateral pivotal movement relative to said support means respectively, a formed rail element stationarily positioned adjacent said support means and said conveying means, and means secured to each of said conveying means for engaging said rail, said rail being formed to laterally pivot each of said conveying means out of and into longitudinal alignment with each other as the respective conveying means move relative to said rail, said rail engaging means being pivotally secured to a laterally extending portion of each conveyor and longitudinally spaced from the pivotal connection connecting said support means and said conveying means.

References Cited by the Examiner

UNITED STATES PATENTS

| | | | |
|---|---|---|---|
| 1,154,545 | 9/15 | Penedo | 198—89 X |
| 1,458,043 | 6/23 | Follansbee | 198—92 |
| 2,780,451 | 2/57 | Alspaugh et al. | 198—92 X |
| 2,799,386 | 7/57 | Moon | 198—92 |

SAMUEL F. COLEMAN, *Primary Examiner.*

JULIUS E. WEST, ERNEST A. FALLER, *Examiners.*